Jan. 21, 1969          J. A. KEIFER          3,422,473
ROTARY CUTTER AND ADJUSTABLE SHIELD THEREFOR
Filed May 26, 1967
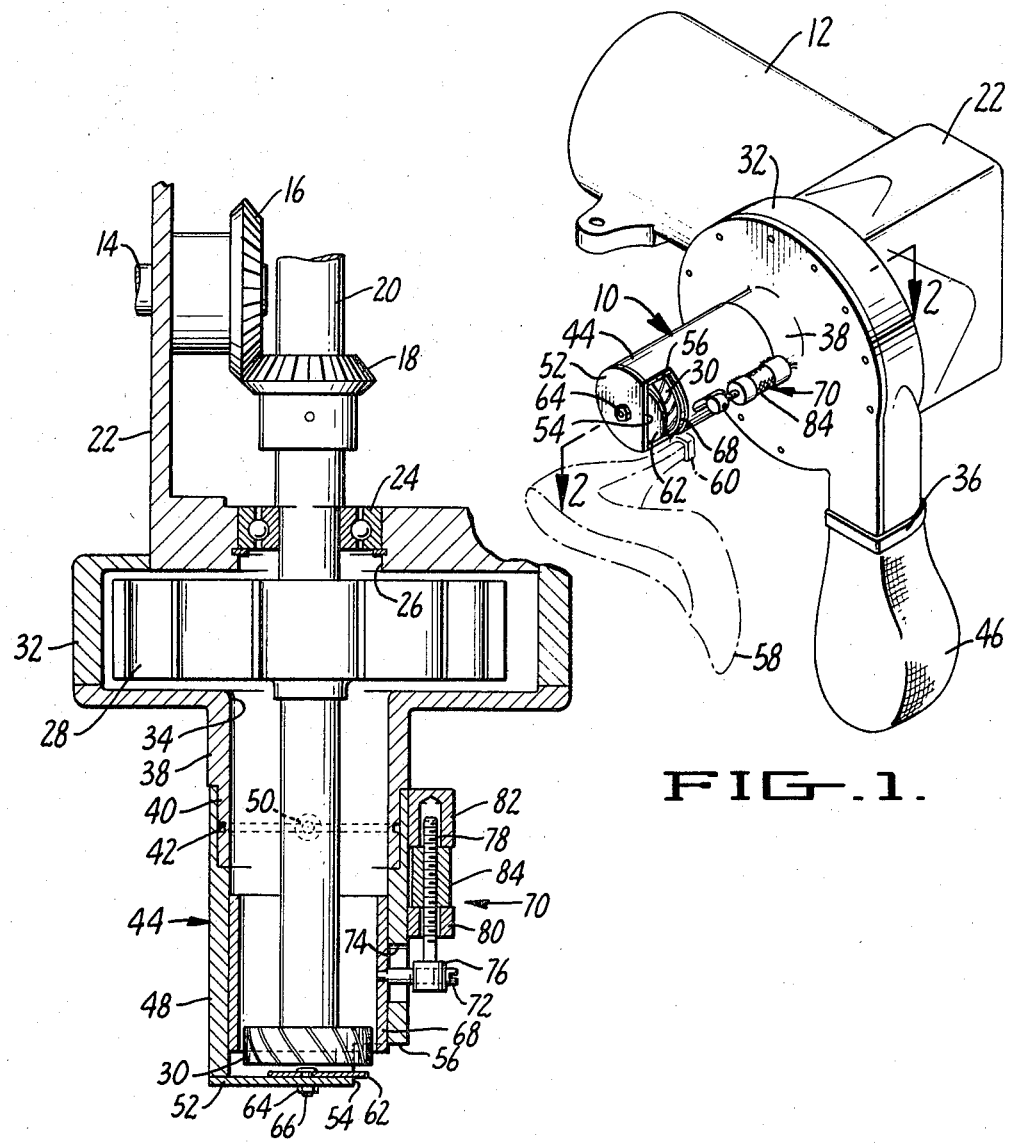
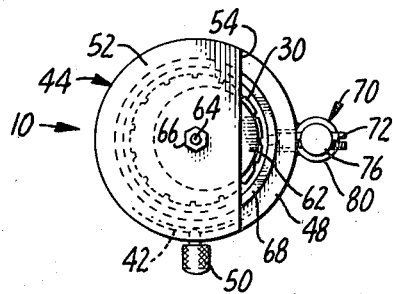
INVENTOR.
JAMES A. KEIFER
BY
Naylor + Neal
ATTORNEYS

3,422,473
ROTARY CUTTER AND ADJUSTABLE SHIELD
THEREFOR
James A. Keifer, 2138 Irving St., San Francisco,
Calif. 94122
Filed May 26, 1967, Ser. No. 641,588
U.S. Cl. 12—91         5 Claims
Int. Cl. A43d 27/00

ABSTRACT OF THE DISCLOSURE

An assembly comprising, as its basic elements, a circular cutting wheel and tubular housing received thereover to selectively limit the degree to which a work piece may be directed into contact with the wheel. The housing has a lateral opening therein designed for the direction of a work piece therethrough into contact with the wheel and the limit function of the assembly is provided by a screw operated closure member cooperating with the opening to selectively vary the exposure of the wheel therethrough. In the preferred embodiment, the housing communicates interiorly with a vacuum source.

---

The present invention relates to the art of rotary cutters, and, more particularly, to the art concerned with such cutters designed for use in the manufacture and repair of shoes to effect trimming. In its more specific aspects, the invention is directed to an adjustable rotary cutter shielding arrangement for use in the trimming of heel lifts on high heeled shoes.

In the prior art, various types of rotary cutters have been provided with shields or guards to limit the degree to which a work piece may be directed thereto. The guards or shields employed in the shoe industry have been provided, primarily, to prevent scuffing of the shoe upper during trimming of its sole and heel during manufacture and repair operations. The latter guards or shields have had the disadvantage, however, that they have not provided for ready and accurate adjustment. This disadvantage has proved particularly acute in the shoe repair industry, where shoes of different sizes and shapes are continuously encountered.

Prior art shields and guards for rotary cutters used in the shoe industry have typically been designed for use on large multiple stage machines where little or no provision is made for disposal of cuttings. Thus, these shields or guards have also had the disadvantage that they were not facilitated for use in shoe repair shops and other confined areas where space and expense limitations made the employment of large debris throwing machinery impractical.

Patent No. 1,814,668 is representative of the prior art in the field to which the present invention pertains.

In summary, the shield of the present invention comprises a tubular housing adapted to be received over a circular cutting wheel in substantially coaxial orientation relative thereto. The housing has a lateral opening therethrough through which a work piece may be directed into engagement with a wheel received therein. One of the primary aspects of the invention comprises a screw actuated closure member mounted for axial movement relative to the housing to selectively vary the area of the lateral opening through which a work piece may be extended. Another primary aspect of the preferred embodiment of the invention is the provision of an extended portion on the housing to which a vacuum may be applied to effect the removal of cuttings.

The principal object of the invention is, accordingly, to provide a shield for a rotary cutting wheel which facilitates accurate select adjustment of the exposed area of the cutting wheel and the vacuum removal of cuttings.

Yet another and related object of the invention is to provide such a shield for use in an assembly ideally suited for driving by small fractional horsepower motors.

These and other objects of the invention will become more apparent when viewed in light of the following detailed description and accompanying drawings, wherein:

FIG. 1 is a perspective view illustrating the entire assembly of the invention secured to a fractional horsepower electric motor and showing, in phantom, a shoe in the process of being trimmed by the assembly.

FIG. 2 is a sectional view taken on the plane designated by line 2—2 in FIG. 1; and FIG. 3 is an end view of the shield employed in the assembly of the invention, as viewed from the lower end of FIG. 2.

Referring now specifically to the drawings, the assembly of the invention is designated therein by the numeral 10. The assembly is shown mounted on and coupled in driving engagement with a fractional horsepower electric motor 12. The motor 12 is of conventional nature and has the output shaft thereof, designated by the numeral 14, keyed to a beveled drive gear 16. The drive gear 16 is drivingly engaged with a driven beveled gear 18 which is mounted on a driven shaft 20 to effect rotation thereof. The gears 16 and 18 are designed to effect a speed increase to optimize the cutting operation of the assembly 10, as will become more apparent subsequently. This speed increase might typically be from 3,600 r.p.m. on the shaft 14 to 5,500 r.p.m. on the shaft 20.

The shaft 20 is rotatably supported in a journal box 22 by a pair of ball bearings 24 (only one of which is illustrated) received in opening 26 in opposite sides of the box. Although not illustrated, it is to be understood that the opposite sides of the box 22 carrying the journals 24 are substantially identical and that the shaft 20 might be extended through the side which is not shown for coupling to any desired device. In operation, the box 22 is secured against movement. This may be effected by mounting the box directly to the motor 12 and/or to a suitable fixture or table.

The assembly 10 comprises, in addition to the shaft 20: a centrifugal blower impeller 28 concentrically mounted on the shaft 20 for rotation therewith; a rotary cutting wheel 30 concentrically mounted on the distal end of the shaft 20 for rotation therewith; an impeller housing 32 received around the impeller 28 to define therewith a centrifugal blower having an inlet opening 34 and an outlet opening 36; a collar 38 fixed to the housing 32 and extending outwardly from the opening 34 therein in concentric relationship with the shaft 20, said collar having a necked-down distal portion 40 with an annular groove 42 formed therearound; and, a shield 44 removably mounted on the collar 38 in concentric relationship to the shaft 20 and cutting wheel 30. Impeller housing 32 is fixedly secured to the journal box 22 for support thereby and has an air pervious collection bag 46 secured in receiving relationship to its outlet opening 36. Through this arrangement, driving of the shaft 20 rotates the impeller 28 within the housing 32 which, in turn, functions to draw air and cuttings from the interior of the shield 44 to discharge into the bag 46. The cutting wheel 30 has a grooved peripheral cutting surface thereon of relatively conventional nature. The shield 44 provides for controlled exposure of this surface.

As its basic element, the shield 44 comprises a tubular housing 48 of cylindrical cross section. The interior end of the housing 48 is removably received over the collar 38 and has extending threadably therethrough a set screw 50 adapted to seat in the groove 42. The set screw 50 provides for locking of the housing 48 to the collar 38 at any select angular orientation relative thereto. The exterior end of the housing 48 has a plate 52 fixed thereto and extending partially thereacross. The partial character of the plate 52 provides an open portion at the end of the housing 48 defined, in part, by an exposed edge 54 on the plate. The exterior end of the housing is also provided with a lateral opening 56 communicating with the open portion defined by the end plate 52 and positioned so as to expose the peripheral surface of the cutting wheel 30 received in the housing.

The opening 56 and the open end portion of the housing 48 communicating therewith provide, together, an open area through which a work piece may be directed into cutting engagement with the peripheral surface of the wheel 30. This function is illustrated by the phantom line representation of the shoe, designated by numeral 58, in FIG. 1. As there represented, the shoe 58 is shown as having a raw heel lift 60 which is in the process of being trimmed by the cutting action of the wheel 30.

The area of the housing 48 open to the peripheral surface of the cutting wheel 30 is provided with both end and lateral adjustment structures. The end adjustment structure is designed to selectively limit the degree to which a work piece may be moved radially against the peripheral cutting surface of the wheel 30. The lateral adjustment structure is designed to selectively limit the degree to which a work piece may be moved axially across the peripheral cutting surface of the wheel 30. Together the structures effect control of the depth and height of cut which may be made by the cutting wheel 30.

The end adjustment structure comprises a circular disc 62 having a mounting screw 64 extending eccentrically therethrough through an opening in the plate 52 disposed in alignment with the longitudinal axis of the housing 48. A nut 66 is threadably received on the external end of the screw 64 to lock the plate 62 against the plate 52 at any select angular orientation relative thereto. Thus, the degree to which the plate 62 extends across the cutting wheel 30 may be selectively varied. This degree is, however, generally maintained constant. The purpose of the adjustment provided by the plate 62 is primarily to compensate for wear of the wheel 30.

The lateral adjustment structure comprises a tubular closure member 68 slidably received in the housing 48 for axial movement relative thereto and the screw actuator 70 adapted to selectively impart movement to the member. The screw actuator 70 comprises: a stud 72 extending slidably through a slot 74 provided therefor in the housing 48 radially into fixed engagement with the member 68; a block 76 having an opening therein received over the stud 72; a screw 78 fixed to and extending laterally from the block 76 in longitudinal alignment with the housing 48; a pair of spaced ears 80 and 82 fixed to and extending radially from the housing 48 and having openings therein loosely receiving the screw 78; and, a nut 84 threadably received on the screw 78 between the ears 80 and 82. Through this arrangement, turning of the nut 84 functions to move the screw 78 longitudinally relative to the housing 44. This, in turn, moves the closure member 68 axially relative to the housing 48 and across the opening 56.

The lateral adjustment structure has the particular advantage that the screw and nut arrangement provides for accurate and ready adjustment of the closure member in "micrometer" fashion. This operation is enhanced by knurled surface on the nut 84 which facilitates its ready turning by the thumb or finger of the user.

Attention is here invited to the arrow lines leading to the opening 56 illustrated in FIG. 2. These lines indicate the manner in which air and cuttings are drawn into the housing 48 during operation of the assembly. From the opening 56, the cuttings are transmitted by vacuum through the interior of the housings 48 and 32 and into the bag 46.

While a preferred embodiment has been illustrated and intended to be so limited, but rather as defined by the described, it is to be understood that the invention is not following claims.

What is claimed is:
1. A shield for use in combination with a circular cutting wheel mounted for rotation about the axis thereof and having a peripheral cutting surface thereon, said shield comprising:
  (A) a tubular housing adapted to be received over said wheel in substantially coaxial orientation relative thereto to permit said wheel to rotate freely therein, said housing having a lateral opening therethrough through which a work piece may be directed into engagement with the peripheral surface of a cutting wheel received therein;
  (B) means to fix said housing against rotational movement with and axial movement relative to a cutting wheel received therein;
  (C) a closure member mounted for longitudinal movement relative to said housing and across said opening to vary the degree to which the peripheral surface of a wheel disposed in said housing is exposed through said opening; and
  (D) a pair of threadably interengaged elements mounted, respectively, on and against axial movement relative to said housing and closure member:
    (1) said elements extending longitudinally of said housing; and
    (2) at least one of said elements being disposed for threadable rotation relative to the other to effect selective movement of said closure member longitudinally across said opening responsive to such threadable rotation.

2. A shield according to claim 1, further comprising:
  (A) a duct communicating with the interior of said housing; and
  (B) a vacuum inlet communicating wtih said duct.

3. A shield according to claim 1, wherein:
  (A) said closure member comprises an interior element slidably received within said housing in mating engagement with the interior surface thereof;
  (B) said threadably interenegaged elements comprise respectively:
    (1) a first screw element mounted on said interior element in exteriorly disposed longitudinally extending relationship relative to said housing; and
    (2) a second screw element mounted on said housing in exteriorly disposed longitudinally extending relationship relative thereto.

4. A cutter combination comprising:
  (A) a rotary driven shaft having a cutting wheel mounted on the distal end thereof for rotation therewith, said wheel having a peripheral cutting surface;
  (B) a centrifugal blower impeller mounted coaxially on said shaft intermediate the ends thereof for rotation therewith;
  (C) an impeller housing disposed around said impeller to define therewith a contrifugal blower, said housing having an inlet eye disposed substantially coaxially to said shaft in facing relationship to said wheel and an outlet opening;
  (D) a tubular housing extending over said wheel in substantially coaxial orientation relative thereto to permit said wheel to rotate freely therein and extending from said wheel to interior fluid communication with the inlet eye of said impeller housing, said tubular housing having a lateral opening therethrough through which a work piece may be directed into engagement with the peripheral surface of said wheel;
  (E) means adapted to fix said tubular and blower housings against rotational movement relative to said shaft and cutting wheel;
  (F) a closure member mounted for axial movement relative to said tubular housing and across the lateral opening therein to vary the degree to which the peripheral surface of said wheel is exposed through said opening; and (G) a pair of threadably interengaged elements mounted, respectively, on and against axial movement relative to said tubular housing and closure member, at least one of said elements being disposed for threadable rotation relative to the other to effect selective movement of said closure member across the lateral opening in said tubular housing.

5. A shield for use in combination with a circular cutting wheel mounted for rotation about the axis thereof and having a peripheral cutting surface thereon, said shield comprising:

(A) a tubular housing adapted to be received over said wheel in substantially coaxial orientation relative thereto to permit said wheel to rotate freely therein, said housing having a lateral opening therethrough through which a work piece may be directed into engagement with the peripheral surface of a cutting wheel received therein;

(B) means to fix said housing against rotational movement with and axial movement relative to a cutting wheel received therein;

(C) a closure member mounted for axial movement relative to said housing and across said opening to vary the degree to which the peripheral surface of a wheel disposed in said housing is exposed through said opening;

(D) a pair of threadably interengaged elements mounted, respectively, on and against axial movement relative to said housing and closure member, at least one of said elements being disposed for threadable rotation relative to the other to effect selective movement of said closure member across said opening and wherein:

(1) upon being received over a wheel a distal end of said housing is disposed immediately adjacent one of the lateral surfaces of said wheel;

(2) said opening is disposed adjacent said distal end; and (3) said distal end is provided with an open portion communicating with said opening, and further comprising:

(a) a stop mounted on said distal end for movement across said open portion towards and away from said opening; and (b) means adapted to lock said stop on said distal end at select positions relative to said opening.

References Cited

UNITED STATES PATENTS

| | | | |
|---|---|---|---|
| 972,151 | 10/1910 | Blair | 12—90 |
| 1,236,397 | 8/1917 | Blaisdell | 12—1 |
| 1,814,668 | 7/1931 | Crossman | 12—91 |
| 2,263,682 | 11/1941 | Minett | 12—1 |

PATRICK D. LAWSON, *Primary Examiner.*